(No Model.)
H. W. SLATER.
ANTIRATTLING THILL COUPLING.
No. 582,699. Patented May 18, 1897.
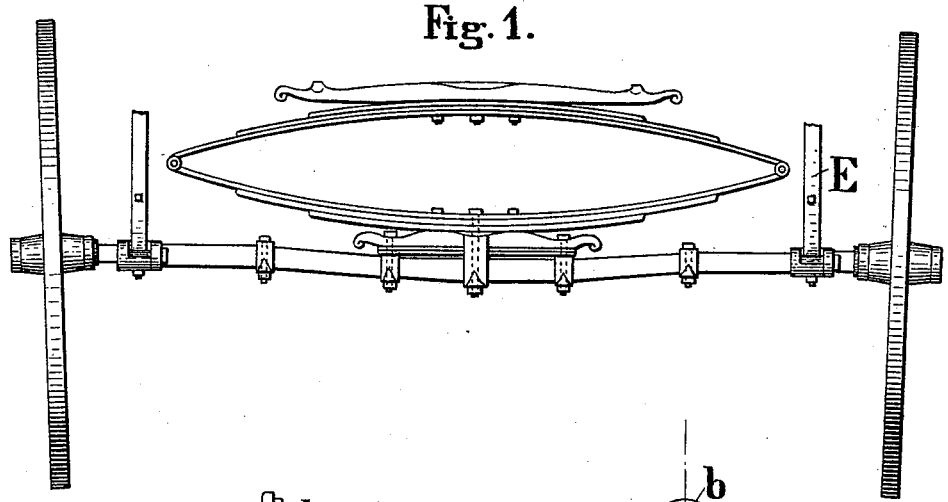
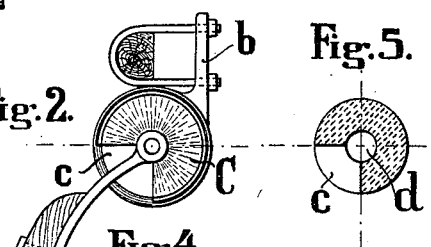
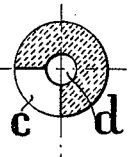
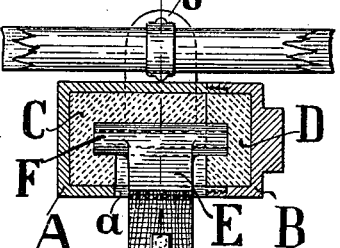
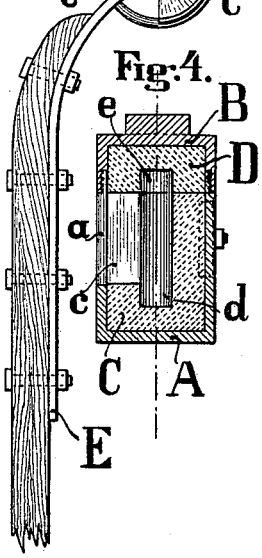
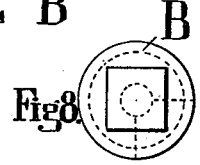
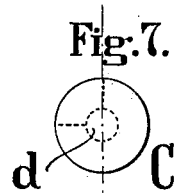
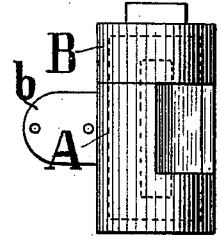
WITNESSES:
INVENTOR:
Herman W. Slater.

UNITED STATES PATENT OFFICE.

HERMAN W. SLATER, OF CHICAGO, ILLINOIS.

ANTIRATTLING THILL-COUPLING.

SPECIFICATION forming part of Letters Patent No. 582,699, dated May 18, 1897.

Application filed February 5, 1897. Serial No. 622,162. (No model.)

*To all whom it may concern:*

Be it known that I, HERMAN W. SLATER, a citizen of the United States, residing at Chicago, in the county of Cook and State of Illinois, have invented certain new and useful Improvements in a Combination Antirattler and Shaft-Clip, of which the following is a specification.

This invention relates to improvements in devices to be used for coupling or connecting the shafts or thills to the axle of a vehicle; and it consists in certain peculiarities of the construction, novel arrangement, and operation of the various parts thereof, as will be hereinafter more fully set forth and specifically claimed.

The objects of my invention are, first, to provide a connection for each of the shafts or thills which shall be simple and inexpensive in construction, strong, durable, and effective in operation, and, second, such a connection or coupling which by reason of the peculiar construction, arrangement, and operation of its parts will prevent rattling, or, in other words, render the coupling noiseless.

Still another object of my invention is to enable the shafts to be raised to any desired height and there retained.

In order to enable others skilled in the art to which my invention pertains to make and use the same, I will now proceed to describe it, referring to the accompanying drawings, in which—

Figure 1 is a front view in elevation of the front portion of a vehicle, showing my antirattlers and shaft-clips attached to the axle thereof. Fig. 2 is an enlarged side view, partly in section, of one of the antirattlers and clips and a portion of one of the shafts or thills. Fig. 3 is an enlarged plan view of a portion of one of the thills and a part of the axle, showing the antirattler in section. Fig. 4 is a central sectional view of one of the antirattlers detached. Fig. 5 is a cross-sectional view of the cushion for the shaft-iron. Fig. 6 is a view in side elevation of said cushion. Fig. 7 is an end view thereof. Fig. 8 is a view of one end of the cylindrical casings for one of the cushions, and Fig. 9 is a view in elevation of one of said casings.

Similar letters refer to like parts throughout the different views of the drawings.

E represents the shaft-irons, which may be bolted or otherwise secured to the shafts or thills, as is clearly shown in Figs. 2 and 3 of the drawings. The free end of each of the shaft-irons E is formed or provided with a transverse portion F, which is cylindrical in cross-section and may be hollow, as shown by dotted lines. (See Fig. 3.) The transverse portion F extends from either side of the iron E, and thus forms a T-shaped piece.

The cylindrical casings A are each provided with a segmental or quadrantal recess $a$ in its front surface, through which the shaft-irons E extend and operate. One end of each of the casings A is open and screw-threaded to engage a screw-threaded cap B. The lower portion of each of the cylindrical casings A is formed or provided with a rearwardly-extending arm $b$, having openings for the reception of the ends of a clip, which is passed over the axle and is secured thereon by means of nuts on the ends of said clip, as is shown in Fig. 2 of the drawings.

Within each of the casings A is located a cylindrical cushion C, which is made of rubber or other suitable flexible material and is provided with a longitudinal and cylindrical opening $d$ to receive the transverse portion F of the shaft-iron. Each of the cushions is also provided at a right angle to its opening $d$ with a segmental or quadrantal recess $c$, through which the shank of the shaft-iron passes and operates.

Within each of the caps B is located a rubber cushion D, having in its surface adjacent to the cushion C a central opening $e$ to receive one end of the transverse portion F of the shaft-iron.

To use my combined antirattler and shaft-clip, the casings A are secured on the axle of the vehicle by means of the clips or in any suitable manner, and the shaft-irons E, having on their transverse portions F the cushions C, may be inserted into said casings through the open ends and recesses $a$ thereof, when the caps B, provided with the internal cushions D, may be screwed on the open ends of the casings until the ends of the transverse portions F are impinged by the rubber cushions, when the shafts or thills may be raised to any desired position and there retained by reason of the clamping of said cushions.

It is apparent that as each of the casings and cushions C therein is provided with a segmental section, which are usually quadrantal or of about a quarter-circle, the shafts may have a vertical movement of about ninety degrees, and as the cushions C and D are clamped tightly and rigidly held within the cylindrical casings the portions F will turn in the openings $d$ and $e$ thereof, and that any noise incident to the lateral movement of the shaft-irons will be prevented. The portions F, as before stated, may be hollow to receive pins or bolts when it is desired to connect them to ordinary eye-clips on the shaft in the event of the casings becoming broken or otherwise out of repair. It is also apparent that by forming the portions F hollow the sections C and D of the cushions may be embedded therein by screwing the cap B tightly on each of the cylinders A, and thereby more rigidly secure the said portions within the cushions, so that the shafts will be more firmly held in the desired position, yet the transverse portions F will be allowed to turn in their respective cushions.

Having thus fully described my invention, what I claim as new, and desire to secure by Letters Patent, is—

1. The combination of a cylindrical casing, provided with a quadrantal recess in its front portion and having means to secure it to the axle of the vehicle, of a cushion located in said casing and having a quadrantal recess in its front portion, and a central opening, a T-shaped iron having its transverse portion located in the opening of the cushion and its shank extending through the recesses of said cushion and casing, substantially as described.

2. The combination of a cylindrical casing, provided with a quadrantal recess in its front portion and having one of its ends open and screw-threaded, of means to secure the casing to the shaft of the vehicle, the cushion-section C located within the casing and having a central opening and a quadrantal recess in its front portion, a screw-threaded cap to engage the open end of the casing, the cushion-section D, located in the cap and having a central recess, and a T-shaped iron having its transverse portion in the opening of the cushion-sections, and its shank extending through the recesses of the cushion and casing, said transverse portion adapted to turn within the cushion, and the shank thereof having a vertical movement, substantially as described.

3. The combination of a slotted cylindrical casing, having one of its ends open and screw-threaded, with means to secure it to the axle of the vehicle, a sectional cylindrical cushion having a central opening and a quadrantal recess communicating therewith in its front portion, a screw-threaded cap to engage the screw-threads on the open portion of the slotted cylinder and adapted to contact with one end of the cushion, and a hollow T-shaped iron having its transverse portion located in the opening of the cushion and its shank extending through the recesses of the cushion and casing, substantially as described.

HERMAN W. SLATER.

Witnesses:
LOUIS KRAMPE,
F. M. LA. FREENIER.